Sept. 29, 1959   G. J. WILLIAMS   2,906,140
ADJUSTABLE MOTION TRANSMITTING LINKAGE
Filed Oct. 20, 1958   2 Sheets-Sheet 1

GERALD J. WILLIAMS
INVENTOR.
BY Edwin C. McRae
John R. Faulkner
Donald J. Harrington
ATTORNEYS Sept. 29, 1959  G. J. WILLIAMS  2,906,140
ADJUSTABLE MOTION TRANSMITTING LINKAGE
Filed Oct. 20, 1958  2 Sheets-Sheet 2
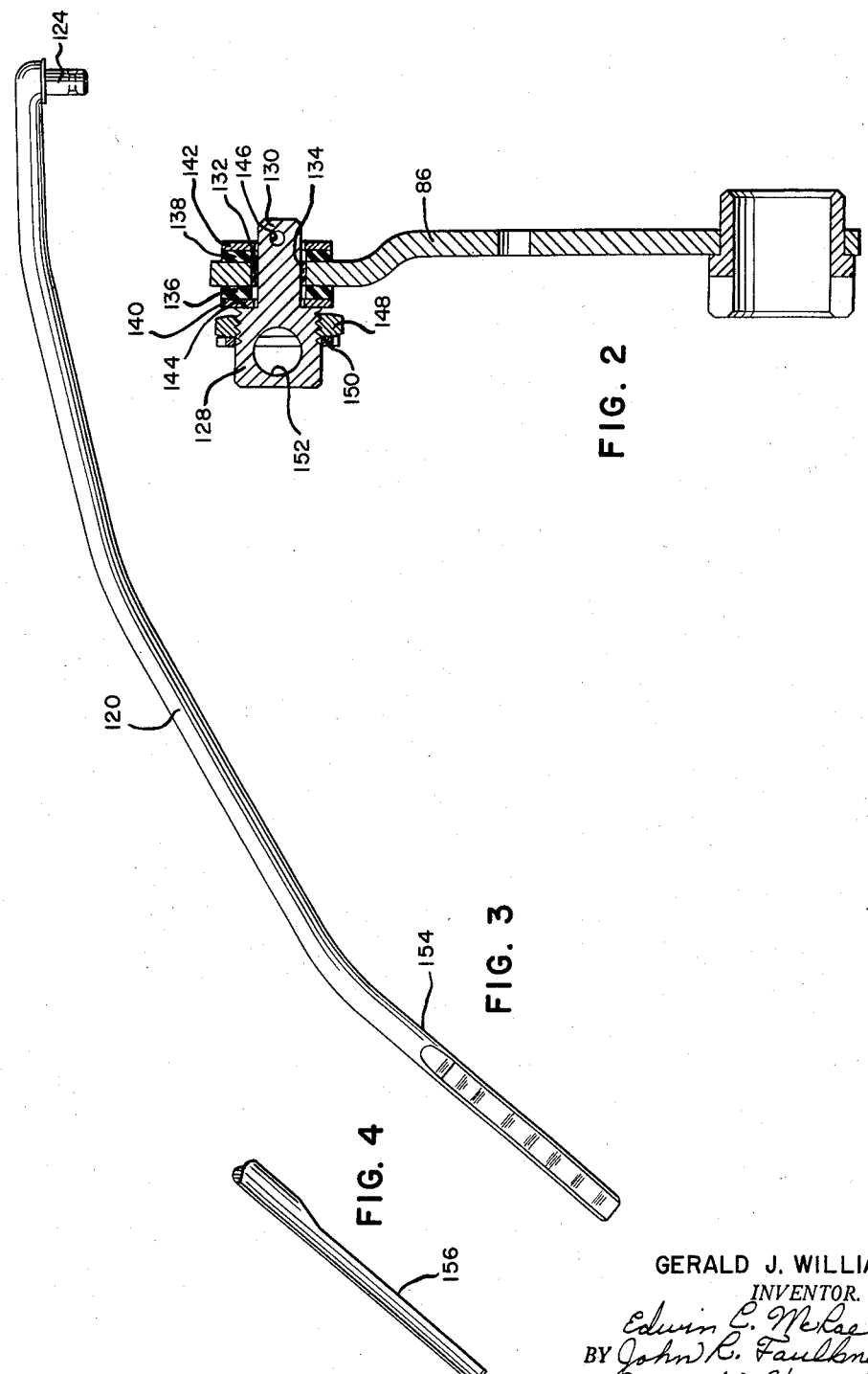
GERALD J. WILLIAMS
INVENTOR.
BY Edwin E. McRae
John R. Faulkner
Donald J. Harrington
ATTORNEYS

United States Patent Office 2,906,140
Patented Sept. 29, 1959

2,906,140

ADJUSTABLE MOTION TRANSMITTING LINKAGE

Gerald J. Williams, Livonia, Mich., assignor to Ford Motor Company, Dearborn, Mich., a corporation of Delaware Application October 20, 1958, Serial No. 768,449

4 Claims. (Cl. 74—473)

My invention relates generally to a mechanical linkage mechanism and more particularly to a motion transmitting linkage in which provision is made for readily adjusting one element of the mechanism relative to another so that the driven member will move within desired limits. The improved linkage mechanism of my invention is particularly adapted to be used in an automotive vehicle for transferring motion from a manually operated gear shift lever to a transmission shift control element of a multiple speed power transmission mechanism.

It is common practice in the automotive industry to provide a manually operated shift lever within the passenger compartment of an automobile and it is usually mounted on the steering wheel column. The shift lever is mechanically coupled to movable gear shifter members within the transmission mechanism by means of motion transmitting linkage elements and these elements require adjustment after assembly so that movement of the manually operated shift lever will result in a desired movement of the transmission gear elements during a shift from one transmission ratio to another. With the linkage mechanisms heretofore employed this adjustment is quite cumbersome and time consuming and the adjustment itself is somewhat coarse.

According to a principal feature of my invention, means are provided for conveniently obtaining a relatively fine adjustment of the linkage elements and this adjustment may be made after the transmission, the steering column and the linkage elements of the transmission have been assembled. This greatly facilitates quantity production and assembly techniques, reduces assembly time and simplifies servicing of the transmission mechanism.

The provision of an improved linkage mechanism of the type above set forth being a principal object of my invention, it is a further object of my invention to provide an improved linkage mechanism for manually controlling a multiple speed power transmission mechanism including means for conveniently adjusting the elements of the linkage mechanism to obtain the desired motion of the transmission gear shifter elements.

It is a further object of my invention to provide a linkage mechanism of the type above set forth wherein the adjustment may be obtained by using conventional hand tools, and no special skills are required.

For the purpose of particularly describing a preferred embodiment of my invention, reference will be made to the accompanying drawings wherein:

Figure 2 is a cross sectional subassembly view of a principal element of the linkage mechanism of my invention;

Figure 3 is an elevational view of another element of the linkage mechanism of my invention; and Figure 4 is a partial elevational view of the linkage element of Figure 3 wherein the element is displaced 90° from the position shown in Figure 3.

Figure 1:
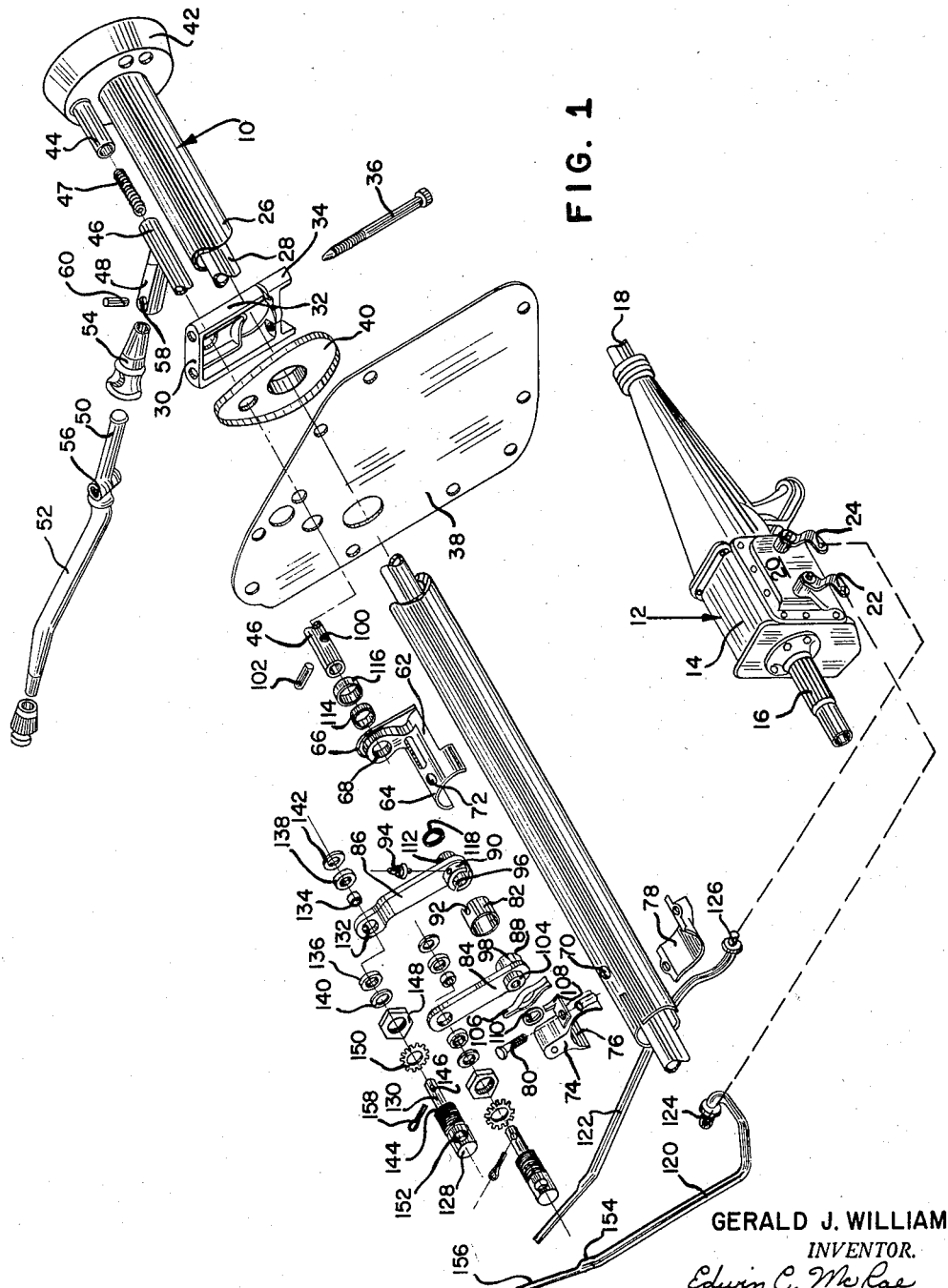
Figure 1 is an exploded assembly view of an automotive vehicle steering wheel column and the associated elements of the improved linkage mechanism of my invention.

Referring first to Figure 1, a steering wheel column for an automotive vehicle is generally identified by numeral 10 and a manually controlled multiple speed power transmission mechanism is shown at 12. The mechanism 12 comprises a housing 14, a power input shaft 16 and a power output shaft 18. The transmission mechanism includes gear elements adapted to form a plurality of torque delivery paths between the power input shaft 16 and power output shaft 18, and each torque delivery path is characterized by an independent speed ratio.

The transmission mechanism 12 may be mounted in the vehicle in a conventional fashion with the shaft drivably coupled to the engine crankshaft and a housing cover plate may be secured to the side of housing 14 as indicated at 20. The cover plate 20 is positioned over a suitable access opening and a pair of shift levers are pivotally mounted thereon as shown at 22 and 24. Each of the levers 22 and 24 are connected to suitable shifter forks within the transmission housing 12 which in turn are adapted to control the transmission gear elements. The shift lever 22 may be rotated in either a clockwise or counterclockwise direction around its pivotal axis to obtain a high or intermediate speed ratio in the transmission mechanism, and the shift lever 24 may be similarly actuated to condition the mechanism for low or reverse drive operation.

The steering column 10 includes a shroud 26 situated concentrically about a driver operated steering shaft 28, the latter being adapted to be connected to the vehicle steering wheel at the upper end thereof. The shroud 26 may be secured to the vehicle dash structure by means of a suitable bracket 30. The bracket 30 includes a main body portion 32 having a circular opening for accommodating the shroud 26 and an end piece 34 which may be bolted by means of bolts 36 to the end of the main body portion 32 in clamping engagement with the shroud 26.

The steering column extends through the fire wall of the vehicle chassis and a suitable insulating gasket 38 is provided at this location, the column 10 extending through a suitable opening formed in gasket 38. A rubber boot 40 may be disposed over the shroud 26 adjacent the fire wall.

Steering column 10 extends in a generally downward direction as indicated in Figure 1 and it may be suitably end supported by the vehicle frame in a conventional fashion. The upper end of the steering column 10 is connected to a supporting member 42 on which is carried an anchor pin 44. A gear shifter rod 46 is slidably supported by anchor pin 44 and a suitable spring 47 may be provided for normally biasing rod 46 in a downward direction. Rod 46 extends in a downward direction parallel to steering shaft 28 and is disposed on the exterior of shroud 26. A suitable opening is provided in the main body portion 32 of the bracket 30, in the boot 40 and in the gasket 38 for the purpose of accommodating the shifter rod 46.

A tubular member 48 is secured to shifter rod 46 and is adapted to receive the end 50 of a driver operated shift lever 52. The end 50 of the lever 52 is rounded as indicated and is adapted to be fitted in a cooperating opening formed in anchor pin 44. A resilient grommet 54 is situated within tubular member 48 and the end 50 of the shift lever 52 is received through the grommet 54. The lever 52 is formed with an eyelet 56 which is aligned with an opening 58 in the tubular member 48 and a pin 60 may be inserted through the eyelet 56 and the opening 58 thereby retaining the shift lever 52 in assembled relationship with respect to shifter rod 46 and anchor pin 44. It is thus apparent that the shifter rod 46 may be moved in either a longitudinal direction parallel to steering shaft 28 or it may be rotated about its own axis in either direction. This compound motion may be utilized to obtain an appropriate shifting movement of the transmission gear elements in a manner which will subsequently become apparent.

A shifter rod supporting bracket is shown at 62 and it includes a portion 64 contoured to fit over the shroud 26 and a transversely extending portion 66 having an opening 68 formed therein. The portion 64 may be bolted or otherwise secured to the upper side of the shroud 26 and suitable openings 70 and 72 are formed in the shroud 26 and in the bracket portion 64 for this purpose. A second bracket 74 is also secured to the lower end of the steering column shroud 26 in spaced relationship with respect to the portion 66 and the bracket 62 and it includes an upper curved portion 76 and a lower curved portion 78 which may be joined together by bolts 80 in clamping engagement around shroud 26.

The shifter rod 46 may extend through the opening 68 formed in the bracket 62 and it may be journaled in a cooperating opening formed in the upper portion 76 of the bracket 74. Rod 46 also extends through a circular adapter 82 which is situated between lever elements or arms 84 and 86. Lever element 84 is formed with a circular boss 88 and lever element 86 is formed with a similar boss 90, the bosses 88 and 90 being disposed in juxtaposed relationship. The adapter 82 is adapted to be received over each of the bosses 88 and 90 and it is notched as shown at 92 for accommodating a grease fitting 94 which is threadably received in boss 90. Transverse slot 96 is formed in the boss 90 and a similar transverse slot 98 is formed in the boss 88 of the lever element 84, the slots 96 and 98 being disposed transversely with respect to each other when they are assembled within the adapter 82.

The rod 46 is formed with an opening 100 in which a pin 102 is received. When the mechanism is assembled the pin 102 is situated within the adapter 82 between the bosses 88 and 90. Lever element 84 is also formed with a bearing portion 104 about which a vibration damper member 106 is received. Member 106 pivotally engages portion 104 and it cooperates with a finger 108 secured to bracket 74 thereby reducing the vibrations transmitted through the rod 46. A washer 110 is situated between bearing portion 104 and bracket 74.

The lever element 86 is similarly formed with bearing portion 112 which may be received within a grease retainer cup 114 which is disposed within the opening 68 of the bracket 62. A washer 116 surrounds the cup 114 and another washer 118 is disposed between bearing portion 112 and bracket portion 66.

When the shifter rod 46 is rotated about its own axis by lever 52, the pin 102 will be brought into alignment with slot 96 formed in the boss 90 of lever element 86. When this occurs, the shifter rod 46 may then be moved in a longitudinal direction parallel to steering shaft 28 so that pin 102 becomes inserted in slot 96. When shift lever 52 is then rotated in either direction, the lever element 86 will similarly be rotated in unison therewith. In a similar fashion, if the shifter rod 46 is moved axially in a generally downward direction by the shift lever 52, the pin 104 will be moved out of the slot 96. The shifter rod 46 may then be rotated about its own axis until pin 102 becomes aligned with slot 98 formed in boss 88 of lever element 84. After this angular position of the rod 46 is obtained, it may be again shifted in a generally downward direction thereby causing pin 102 to enter slot 98. When the rod 46 is then further adjusted about its axis the lever element 84 may be rotated about the axis of shifter rod 46 in unison therewith. Both of the level elements 84 and 86 may therefore be independently adjusted depending upon the position of the shift lever 52.

The lever element 84 is connected to shift lever 24 and lever element 86 is connected to shift lever 22, the connection for lever 22 including a motion transmitting rod 120 and the connection for lever 24 including a motion transmitting rod 122. The rods 120 and 122 are adapted to be suitably connected to levers 24 and 22, respectively, as indicated, the end 124 of rod 120 being adapted to be received through an opening in lever 22 and the end 126 of rod 122 being adapted to be received in a similar opening in lever 24. These rod ends may be retained in place by a suitable cotter pin or by other suitable fastening means.

Referring next to Figures 2, 3 and 4, the connection between lever element 86 and rod 120 is shown in particular detail and it includes an externally threaded locking member 128 having an extended portion of reduced diameter as shown at 130. The extended portion 130 is received within an opening 132 in the radially outward end of lever element 86. By preference, nylon bushing 134 surrounds extended portion 130. Resilient washers or spacers 136 and 138 are situated on either side of lever element 86 and steel flat washers 140 and 142 are located adjacent washers 136 and 138 respectively. Flat washer 140 abuts against a shoulder 144 defined by the threaded portion of the member 128 and the assembly may be retained in place by means of a cotter pin, a suitable opening 146 being provided in the extended portion 130 for the purpose of accommodating the cotter pin.

A nut 148 is threadably received over the threaded portion of the member 128 and a lock washer 150, preferably a star washer, is situated adjacent the nut 148.

The threaded portion of the member 128 is formed with a transverse opening 152 through which one end 154 of rod 120 is adapted to be received. The end 154 may be formed with a flat surface, as best seen at 156 in Figure 4, and the lockwasher 150 may engage the flat surface 156 of the rod end 154 when the nut 148 is appropriately adjusted. By preference, the rod 120 is circular in cross section and the opening 152 is formed with a diameter approximately equal to or slightly greater than the diameter of the rod 120.

It is thus apparent that when the nut 148 is loosened the rod end 154 may be conveniently adjusted relative to lever element 86, and after the desired adjusted position is reached the nut 148 may then be tightened with a suitable hand tool thereby forming a secure connection between the rod 120 and lever element 86. The nylon bushing 134 will accommodate relative rotation between lever element 86 and the member 128 with a minimum amount of friction.

Referring again to Figure 1, the elements of the connection illustrated in Figure 2 are shown in a disassembled, exploded form and they are identified by the numerals employed in the description of Figure 2. The connection between rod 122 and lever element 84 is similar in form to the connection of rod 120 and lever element 86. For purposes of illustrating the various elements of the connection for rod 122, they have been shown in exploded form and in positions which correspond to the positions of the elements of the connection for rod 120. The cotter pin which is referred to in the description of Figure 2 is identified in Figure 1 by numeral 158.

Having thus described the principal features of my improved linkage mechanism, what I claim and desire to secure by U.S. Letters Patent is:

1. In an adjustable linkage system comprising a plurality of motion transmitting linkage elements, an arm pivotally mounted on a stationary support for rotation about a fixed axis, an aperture formed in said arm at a location spaced from said axis, a locking member having a first portion received within said aperture and an externally threaded second portion, an opening formed in said second portion of said locking member, a rod received through the opening in said locking member, a locking nut threadably received on said second portion of said locking member, said nut being adapted to engage said rod thereby maintaining said locking member in fixed relationship with respect to said rod, and bearing means for rotatably journaling said first portion of said locking member in the aperture formed in said arm.

2. In a transmission gear shift linkage mechanism, a manually operated gear shift lever, a transmission shift control member, motion transmitting elements connecting said shift lever and said control member, one of said lever elements being pivotally mounted on a stationary support for rotation about a fixed axis, an aperture formed in said one lever element at a location spaced from said axis, a locking member having one portion thereof received in said aperture, bearing means for accommodating a relative rotation of said locking member with respect to said one lever element including a bushing surrounding said one locking member portion, an opening formed in the second portion of said locking member, said second portion of said locking member being externally threaded, a second lever element being received in the opening in said externally threaded portion, a locking nut threadably received on said externally threaded portion and adapted to lock said second lever element relative to said locking member with said flat surface situated in juxtaposed relationship relative thereto, and a resilient washer disposed about said one locking member portion on at least one side of said one lever element.

3. The combination as set forth in claim 2 wherein said mechanism further includes a lock washer disposed between the flat surface on said rod and said locking nut.

4. In an adjustable linkage system comprising a plurality of motion transmitting linkage elements, an arm pivotally mounted on a stationary support for rotation about a fixed axis, the free end of said arm being apertured, a locking member having a first reduced diameter portion located within the aperture of said arm, said locking member also having a second externally threaded portion of relatively large diameter, said second portion having an opening formed therein, a locking nut threadably received on said second portion, a rod situated in the opening in said second portion, said locking nut being adapted to lock said rod relative to said locking member, said rod having a flat surface formed thereon in juxtaposed relationship with respect to said locking nut, bearing means for accommodating relative rotation between said arm and said locking member including a bushing journaling said extended portion of said locking member, a flat washer received on said reduced diameter portion of said locking member on either side of said arm, one flat washer engaging said threaded portion of said locking member and retainer means acting on the other washer for preventing axial movement of said arm relative to said retainer member and retainer means secured to said reduced diameter portion, and resilient spacers disposed between each flat washer and said arm.

References Cited in the file of this patent

UNITED STATES PATENTS

| 523,944 | Perkins | July 31, 1894 |
| 1,217,960 | Klorer | Mar. 6, 1917 |
| 2,664,761 | Martin | Jan. 5, 1954 |
| 2,838,951 | Dick | June 17, 1958 |